United States Patent [19]

Osada

[11] Patent Number: 5,209,949

[45] Date of Patent: May 11, 1993

[54] METHOD FOR TREATING A STRUCTURAL SURFACE WITH A COATING OF STONES

[76] Inventor: Hideharu Osada, 12-1, Tomiokita 2-chome, Nara-Shi Nara, Japan

[21] Appl. No.: 776,677

[22] Filed: Oct. 10, 1991

Related U.S. Application Data

[63] Continuation of Ser. No. 389,628, Aug. 4, 1989, abandoned.

[30] Foreign Application Priority Data

Aug. 12, 1988 [JP] Japan ................... 63-201487
Nov. 25, 1988 [JP] Japan ................... 63-297331

[51] Int. Cl.$^5$ ........................................... B05D 5/00
[52] U.S. Cl. ................... 427/198; 427/199; 427/201; 427/203; 427/204; 427/272; 427/356; 427/294
[58] Field of Search ............... 427/203, 204, 359, 365, 427/199, 197, 198, 201, 272, 356, 294

[56] References Cited

U.S. PATENT DOCUMENTS

| | | | |
|---|---|---|---|
| 1,915,905 | 6/1933 | Speer | 427/204 |
| 2,002,806 | 5/1935 | Weierich | 427/199 |
| 2,644,768 | 10/1950 | Miller | 427/204 |
| 3,080,253 | 3/1963 | Dietz et al. | 427/203 |
| 3,537,874 | 10/1967 | Romey et al. | 427/272 |
| 3,749,629 | 7/1973 | Andrews et al. | 427/203 |
| 4,352,837 | 10/1982 | Kopenhaver | 427/197 |
| 4,467,007 | 8/1984 | Elgic | 428/142 |
| 4,647,000 | 3/1987 | Osada | 249/150 |
| 4,952,104 | 8/1990 | Osado | 427/264 |

Primary Examiner—Shrive Beck
Assistant Examiner—Benjamin L. Utech
Attorney, Agent, or Firm—Darby & Darby

[57] ABSTRACT

A structural surface such as a wall or pavement related to a building has a patterned layer of stones, which externally retains the texture of the stones. The surface is given a coating of adhesive. A mask of the desired pattern is placed on the adhesive coating. Stones of one characteristics, e.g. color or size, are applied over the mask and adhere to the adhesive layer where the adhesive remains exposed through openings in the mask pattern. Non-adhering stones of the first characteristic are removed; the mask is removed exposing a pattern on the structural surface of said adhesive coating. Stones of a second characteristic are applied to the surface and adhere to the exposed adhesive coating. Excess, non-adhering stones are removed leaving a patterned stony surface, which is then covered with a thin layer of clear plastic material.

3 Claims, 8 Drawing Sheets

METHOD FOR TREATING A STRUCTURAL SURFACE WITH A COATING OF STONES

This is a continuation of application Ser. No. 389,628, filed Aug. 4, 1989, abandoned.

BACKGROUND OF THE INVENTION

This invention relates to a panel, a method for producing the same, and a method for treating the surface of a building, and the like.

The panel described here is a material which gives water resistance and weatherability to a building, and the like, together with an improved external appearance by adhering on the surface.

The term structure, includes not only structures generally referred to as buildings, but also a pavement, road and other grounds having a surface which is levelled smooth to some extent, such as a garden, park and a building courtyard. Surfaces related to a building, such as an outer wall, inner wall, fence, column, ceiling, base, and other various surfaces are included.

Among the conventional methods for finishing an outer wall of a building, there are methods of laying tiles, spreading synthetic resin, and the like. They give a good appearance and water resistance when used on an external concrete wall.

However, laying tiles takes much time and requires the performance of one skilled in the art. Finishing by spraying synthetic resin is easy and its construction period is short, but the finished surface does not usually give the impression of luxury.

An outer wall of a building must not only have its structural properties, but also a beautiful appearance is a very important requirement. Therefore, a conventionally-practiced washing-treating process is frequently considered. The washing-treating process is conducted by adhering small natural stones (particle diameter: 3-10mm) on a wall surface, making the surface flat using a trowel, and the like, and watering thereover to relieve excess stones later. This has an excellent appearance and weatherability.

Thus, it is an excellent construction method, but the operation requires a highly skilled worker and there are few operators who have these skills. This fact leads to a high cost.

In this art, a method has been desired which provides the same external appearance obtained by the washing-treating process or another external appearance, which the conventional washing-treating process cannot provide. The appearance should be combined with good weatherability.

BRIEF DESCRIPTION OF THE INVENTION

Accordingly, as a result of earnest research, the inventor has completed a panel, a method for producing the same, and a method for treating the surface of a building according to the present invention, wherein as to the panel, granular stones with a diameter of about 2-20mm are adhered closely on a sheet having cohesiveness by utilizing an adhesive on said sheet, and synthetic resin is coated thereon. As to the method for producing a panel, the sheet having cohesiveness is moved continuously or intermittently; granular stones are placed thereon, said sheet is inclined so that stones which are not directly adhered to the sheet surface fall off. The stone-coated sheet is then passed between press rolls in a state such that stones which are not adhered are almost entirely removed. Thereafter, synthetic resin is sprayed thereon in a liquid state, dried and the sheet is cut in a predetermined size. As to the method for treating the surface of the building, an adhesive is spread on the surface of a building; granular stones are closely adhered on said adhesive by utilizing the adhesiveness of said adhesive, and synthetic resin is coated thereon.

The panel according to the present invention, by adhering it to a building, provides an external appearance like one obtained by a washing-treating process. The method for treating a surface according to the present invention provides an external appearance like one obtained by a washing-treating process by carrying out the treating method directly on the building.

DESCRIPTION OF THE PREFERRED EMBODIMENTS

Figure 1:
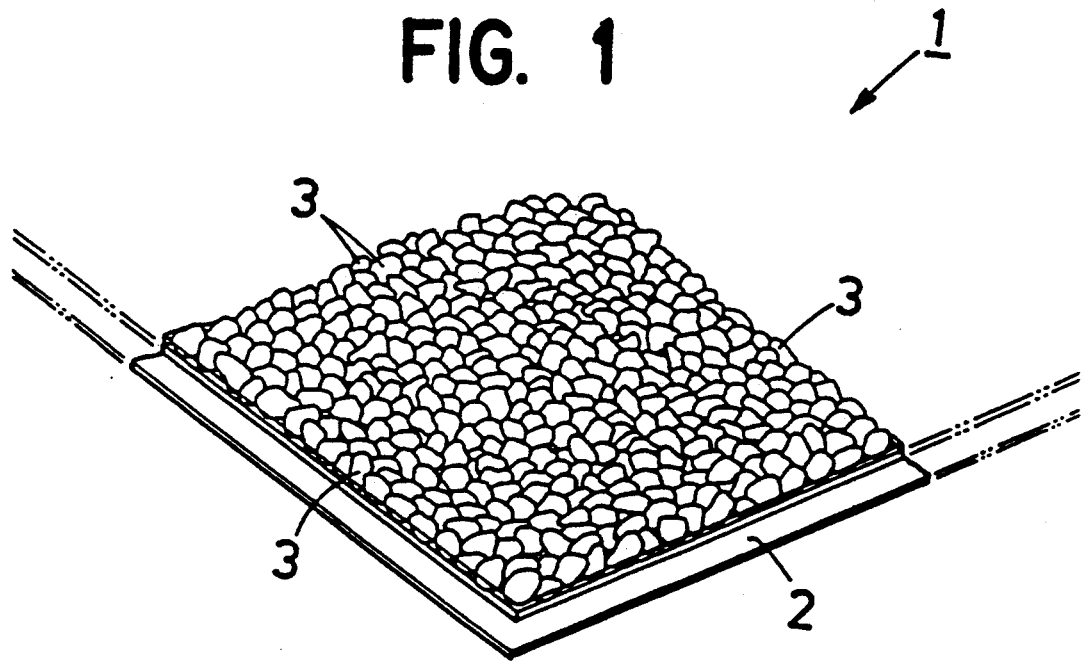
FIG. 1 is a partial perspective view of a panel in accordance with the present invention.

The present invention is described in detail and claimed. First, a panel in accordance with the present invention is described.

When referred to in this specification, "a sheet having cohesiveness" is a rubber-type substrate having adhesiveness semipermanently, that is, a plastic sheet coated with an adhesive, or the like.

A product is on the market wherein the tensile strength is improved by holding a net or strings therein, and it is preferable to use this material as the sheet. Of course, the invention is not limited to this material. If a rubber has the above characteristics, it may be used. Thickness of the rubber sheet is not particularly limited, but about 0.5–3.0mm is preferable.

It is possible to use a plastic sheet coated with an adhesive as a substitute for such a rubber sheet. If a pressure-sensitive adhesive is coated thereon, the same adhesiveness as a butyl rubber sheet is achieved.

The adhesiveness is required only as positioning power to adhere necessary stones so that the necessary stones do not fall off, and the adhesiveness is not necessary to adhere and fix completely like cured resin. This is one of the characteristics of this invention that the inventor devised in order to adhere natural stones smoothly to some extent.

The adhesiveness may exist on a panel only on the one side to which the stones are adhered, that is, it is possible not to have an adhesiveness on the back surface, but it is preferable to have adhesive on the back surface of the sheet or panel when considering the convenience when adhering panels on a building. There is no problem with butyl rubber sheet, since it has adhesiveness on the back surface too.

If the sheet does not have adhesiveness on its back surface, it may need an adhesive when the sheet is attached to a building. Ordinary adhesive may be used in this case.

If the sheet has adhesive on its back surface, it is preferable to apply peeling paper on the back surface for convenience in handling.

The "stones" referred to in this specification are not only natural stones, but also stones which are manufactured by baking, such as ceramics, and the like. Pigment may be mixed in the material in various colors when manufacturing stones.

"Granular" stones are not limited to granular form in a strict sense, but flat or elliptical shapes may be used. The size is 2-20mm, and preferably 5-10mm. There are various colors available in natural stones, and mixed-colored or single-colored stones may be used in a surface. Patterns may be formed using special colored stones at particular portions by using a mold frame (like a mask), described later.

Granular stones may be manufactured by crushing natural stones to a predetermined size. The crushed stones may be separated by shape by a granulator after being crushed.

The term, "adhering closely", does not mean that there is no exposed portion of the sheet, but it means that stones are adhered to almost the whole sheet area. It is logically impossible that there is not some exposed sheet portion when stones are adhered.

The term, "almost whole area", means that there is almost no exposed portion in which a stone, with a size similar to the already adhered stones, can be placed.

The term, "synthetic resin coating", means that a thermoplastic is dissolved, emulsified and dispersed by a solvent, and the like. The prepared thermoplastic is sprayed or spread to cover the granular stones and said plastic coating is dried so as to solidify. A synthetic resin for coating dries naturally as it is, but drying may be accelerated by using a drier. A reactive curing type resin may also be used for coating.

As examples of the synthetic resin, acrylic and epoxy resin are preferable. This synthetic resin is usually transparent to show colors of the granular stones, but colored resin may be used by mixing pigment thereto. Particularly, using colored resin on a part of the surface to make a pattern can create a different and beautiful appearance.

Applying the synthetic resin coating is carried out in the factory, but optionally is may be carried out locally on the site. That is, panels which are not sprayed with synthetic resin are placed on a local pavement, and the like, and then a coat of synthetic resin is spread or sprayed thereover. An advantage of this method is that water proofing and adhesion of joint portions are easy because the surface is coated after positioning the panels. If the building construction is accomplished before coating with the synthetic resin, there is an advantage that the panel can be kept in storage by rolling it in a long length. As a result, since it is carried out in a long length, time and labor to carry out can be saved.

A panel can be adhered easily on a pavement or a wall surface of a building by its own back surface adhesiveness (or with a separate adhesive), e.g., a synthetic rubber sheet, and the like, having cohesiveness. Particularly, when a butyl rubber sheet is used, since it has strong adhesiveness and permanent cohesiveness, it is able to endure a long time in use. Naturally, water resistance is almost complete because the panel is synthetic rubber or a plastic sheet, and since it retains elasticity for a long time, it follows the expansion and contraction of a crack. Therefore, there is no fear of reducing waterproof properties by causing a crack in the rubber sheet itself.

The size of the rubber sheet is not limited, but for ease in handling, about 1m 33 2m is preferable. Of course, size itself has nothing to do with the present invention. Size may be decided appropriately, depending on the use, at the place where the sheet is to be used.

When a panel is adhered on a large wall surface, the adjacent portion between panels is a problem. However, panels can be joined without reducing waterproof properties, if granular stones are not adhered to leave bare only a predetermined width at one edge of the rubber sheet, and the joined sheet is closely overlaid on the part extending up and down. Of course, the adjacent portion is made as a joint portion and may be filled with adhesive material (synthetic resin adhesive such as acrylic emulsion and the like or inorganic adhesive, such as mortar and the like).

If a rubber sheet has some thickness, merely abutting the sheets can cohere the panels by their adhesiveness to keep a waterproof joint.

A method for producing a panel according to the present invention is described below.

The terms, "continuously" or "intermittently", express how the rubber sheet is transferred.

The term, "bringing the sheet upward to incline", means that the sheet is inclined upwardly and transferred and moved.

With regard to spraying synthetic resin for coating, or cutting the panel to a predetermined length, it does not matter which is done first. That is, it may be cut after coating, or it may be coated after cutting.

A method for using a mold frame is as follows:

A mold frame, the back surface of which has had a peeling treatment (it is not necessary to conduct such treatment if the peeling is easy), is adhered on the rubber sheet. Granular stones are placed over the sheet and frame; excessive stones are removed. Then the mold frame is removed and stones of a different color are adhered again on the area of the sheet on which the mold frame was adhered, to give patterns. Furthermore, a plurality of mold frames may be initially adhered on a sheet and said operations are conducted step-wise to give multi-color patterns. Any material such as paper and plastic sheet can be used for the material of the mold frame. The shape of the mold frame may be formed by punching, and the like, freely, according to the pattern to be made.

Finally, a method for treating the surface of a building is described in detail. This method is preferably carried out on the surface of a pavement, and the like and said panel is manufactured on the surface of a building. That is, a rubber sheet is positioned on a pavement; granular stones are placed thereon, and a synthetic resin coating is formed thereover. This on-site method itself is the same as the aforementioned method for manufacturing a panel at a production facility. However, since the treatment is carried out on the surface of a payment directly in this method, liquid or half-solid adhesive may be spread on the surface of the pavement, instead of the rubber sheet.

Excessive granular stones may be removed using suction provided by a vacuum apparatus, or by sweeping or scraping away to remove excess stones, for example, levelling the surface by using a flat plate.

In this method, making a pattern by using a mold frame, is possible as well.

FIG. 1 is a perspective view showing a panel 1 in accordance with the present invention. Natural stones 3 are adhered closely on a butyl rubber sheet 2.

Figure 2:
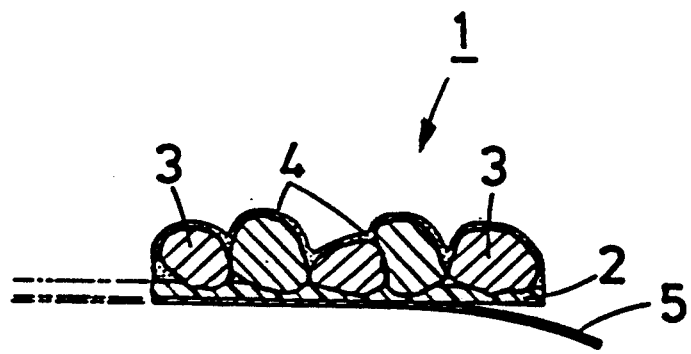
FIG. 2 is a partial enlarged sectional view of FIG. 1.

FIG. 2 is an enlarged partial sectional view of FIG. 1. Transparent synthetic resin 4 for coating is spread on the surface. Peeling paper 5 is adhered on the back surface of the sheet 2.

Figure 3:
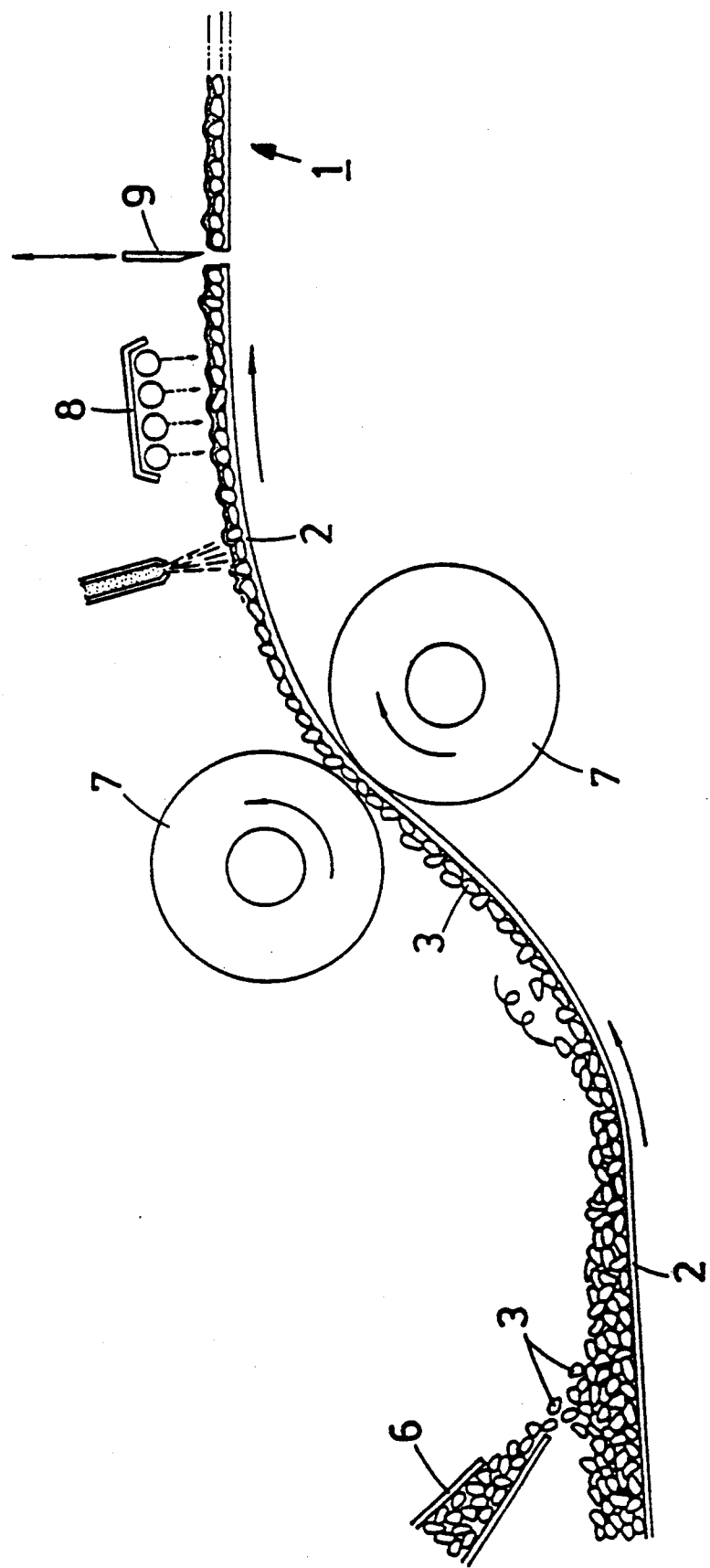
FIG. 3 is a functional diagram of a method for producing a panel in accordance with the present invention.

FIG. 3 schematically illustrates a method for manufacturing the panel of FIG. 1. A plurality of natural stones 3 are placed by natural falling from a feeder 6 onto said butyl rubber sheet 2, which is advanced from the left side of FIG. 3. The butyl rubber sheet 2 is advanced up an incline leading to press rollers 7. At this time, stones 3, which are not adhered to the butyl rubber sheet 2, fall down by gravity force. The stone-adhered sheet is pressed by said press rollers 7 to ensure the adhesion, and to make the surface almost flat. After that, the surface is spread with synthetic resin 4, dried by a drier 8 and cut by a cutter 9.

Figure 4:
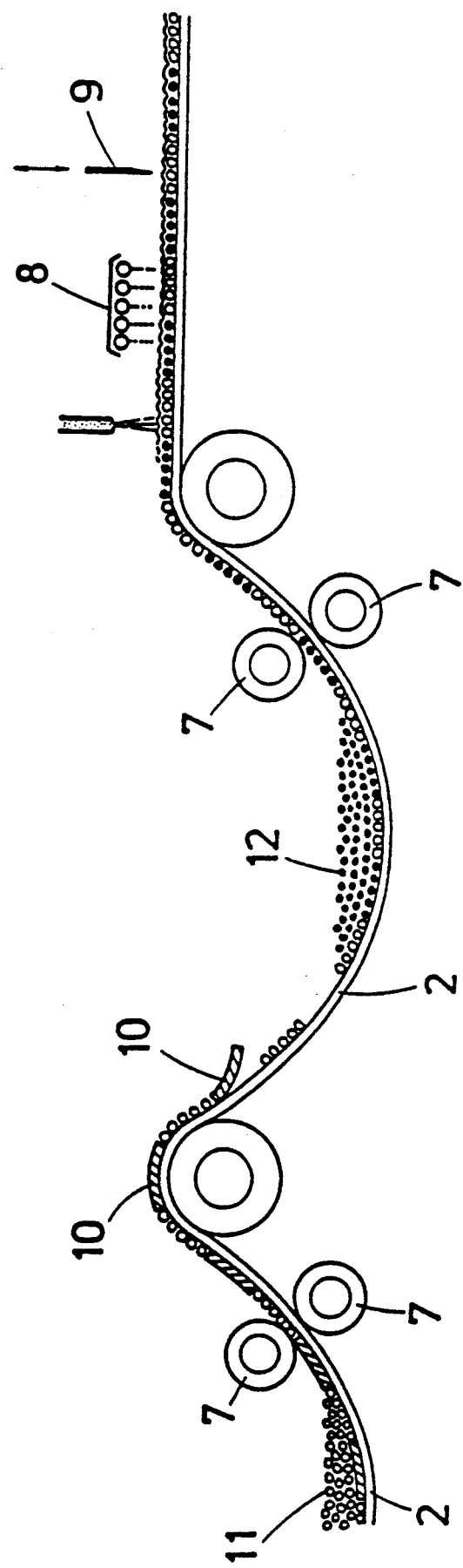
FIG. 4 illustrates an alternative embodiment of a manufacturing method in accordance with the present invention.

FIG. 4 shows another process for making patterns by using a mold frame. A butyl rubber sheet 2 with a mold frame 10 attached to its surface is advanced and natural stones 3 are placed thereon by dropping or pouring the natural stones in the same manner as shown in FIG. 3. However, in this case, the natural stones 11 are of only one selected color. Then stones 11 are not adhered to the sheet 2 at the part where the mold frame is adhered, but the stones 11 adhere only at the portions without a mold frame 10 and at portions which are punched out of the mold frame 10.

The sheet 2 is moved upwardly just as in FIG. 3 to remove by gravity the stones 11 which are not adhered, and then the sheet with adhered stones is pressed by the first set of press rollers 7. The mold frame 10 is then peeled off and natural stones 12, which are a different color from stones 11, are placed on the sheet surface. In this case, the stones 12 are adhered not to the part on which the stones 11 have already been adhered, but the stones 12 adhere to the part on which the mold frame 10 was adhered. The excessive stones are removed by gravity by moving the sheet 2 upward. Then, the sheet 2 is pressed by the second set of press rollers 7. Similarly to FIG. 3, the sheet is sprayed with resin, dried and cut.

Figure 5:
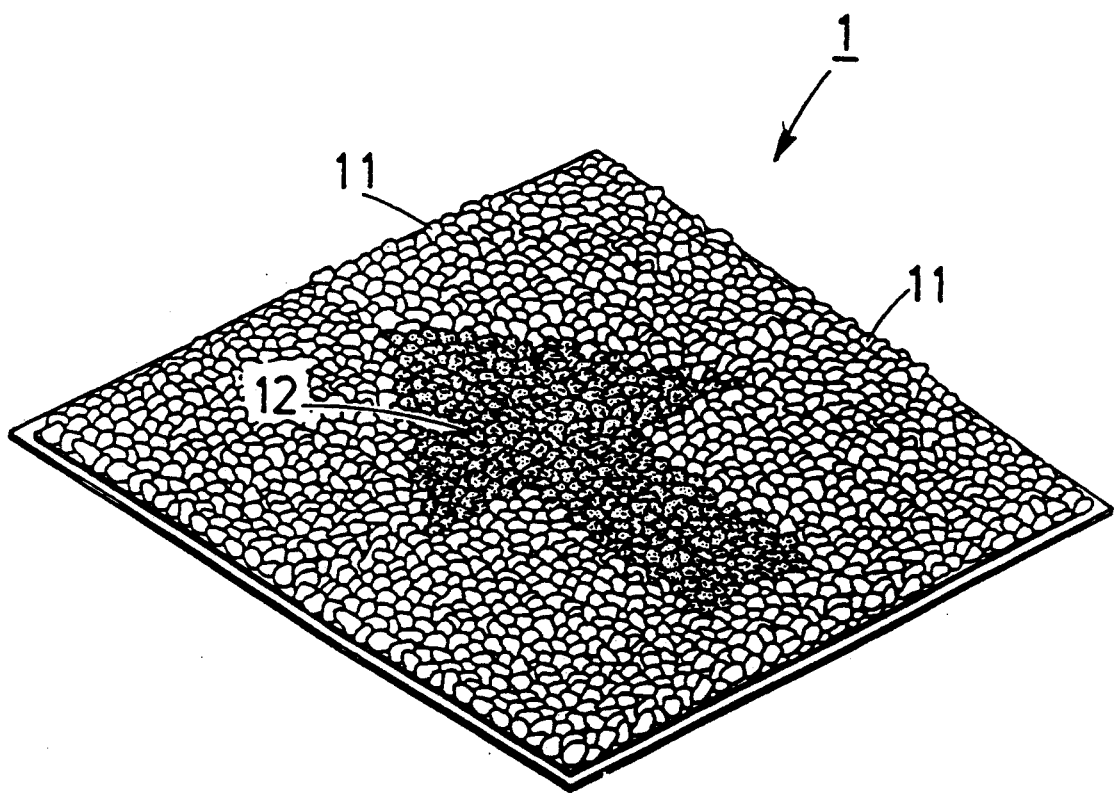
FIG. 5 is a perspective view of a panel manufactured by the method of FIG. 4.

In this case, a panel 1 with pattern like FIG. 5 can be manufactured if the mold frame is shaped in a form of an arrow. FIG. 5 is a patterned panel produced in accordance with the invention.

Figure 6A:
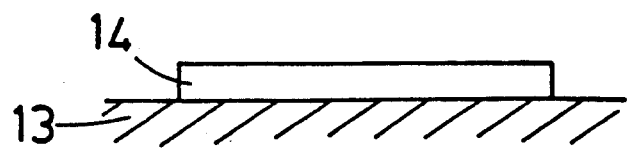
FIG. 6 illustrates a method in accordance with the present invention, wherein views (a) to (e) of FIG. 6 are sectional views, showing operational processes.
Figure 6B:
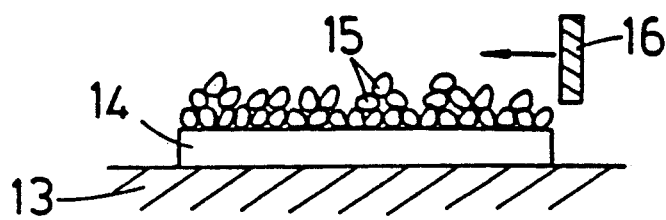
Figure 6C:
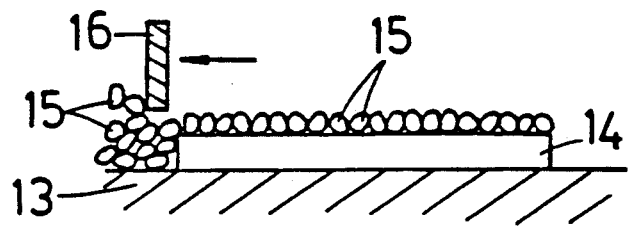
Figure 6D:
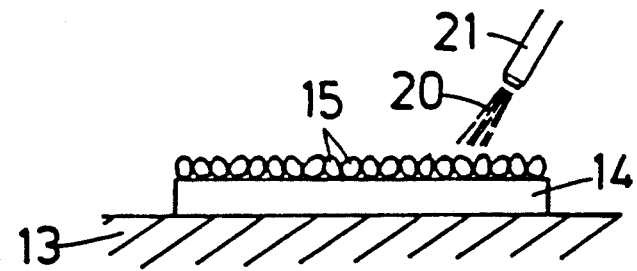
Figure 6E:
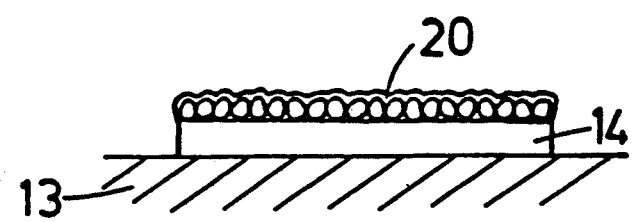

FIGS. 6(a)–(e) are sectional views showing steps of an alternative on-site method for treating a surface in accordance with the present invention. FIG. 6(a) shows a process of spreading an adhesive 14 on the surface of a pavement 13. FIG. 6(b) shows a step of placing a plurality of natural stones 15 on the adhesive 14. In this state, stones of the lowest layer are adhered to the pavement by the adhesive 14, and a remover 16 removes excessive natural stones as shown. FIG. 6(c) shows a method step where the remover 16 has removed excess natural stones 15, and the treated surface is made smooth. Next, synthetic resin (polymethyl methacrylate, and the like) 20 is spread by spraying the stones by a spraying means 21 (FIG. 6(d)). Pressing on the stones from above to make the surface flatter and to strongly adhere the stones to the adhesive layer, may be done prior to coating the synthetic resin 20. FIG. 6(e) shows the state when the synthetic resin coating is finished. The synthetic resin 20 may be dried naturally or by a dryer. At this time, treating the surface according to the present invention is completed.

Small sized natural stones are disposed on the surface of a building at random to provide an external appearance like that produced by a washing-treating surface process conventionally used on the external facing of a building, and to present a fine view.

With a synthetic resin coating 20, stones do not slip or come off. Cracks do not occur in the treated layer because of the elasticity of the synthetic resin and an adhesive lower layer.

FIGS. 7(a)–(i) illustrate an alternative method for on-site treating a surface in accordance with the present invention.

Figure 7A:
FIG. 7 shows another example of a method in accordance with the present invention, wherein views (a) to (i) of FIG. 7 are sectional views, showing operational processes.
Figure 7B:
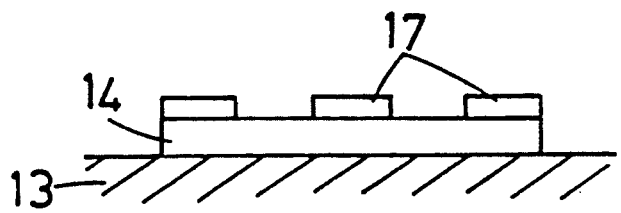
Figure 7C:
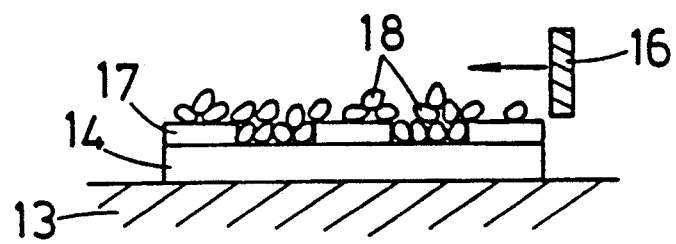
Figure 7D:
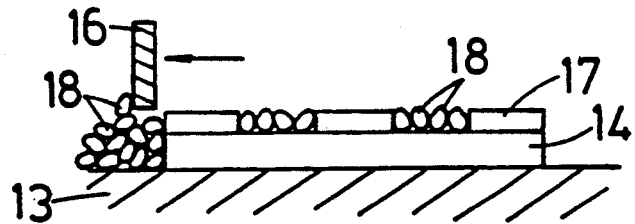

FIG. 7(a) is a view of the same condition as FIG. 6(a). Mold frames 17 are placed on the adhesive layer 14 (FIG. 7(b)). The back surface of this mold frame 17 received a peeling treatment. Stones 18 of a predetermined color (e.g., brown) are placed thereon. Excessive brown stones 18 are removed by a remover 16 just as in FIG. 6 (FIG. 7(c)). Since there is no adhesiveness on the outer surface of the mold frame 17, stones thereon are removed. If left, they can be removed together with the mold frames 17. FIG. 7(d) shows that the excess (brown) stones 18 were removed and the stones 18 are adhered closely at the areas where the adhesive layer 14 was exposed.

Figure 7E:
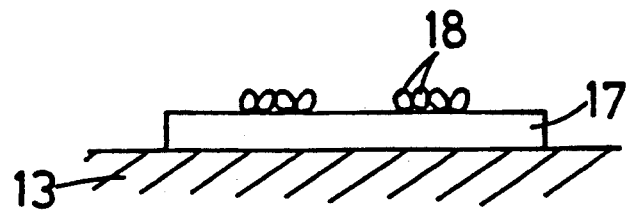
Figure 7F:
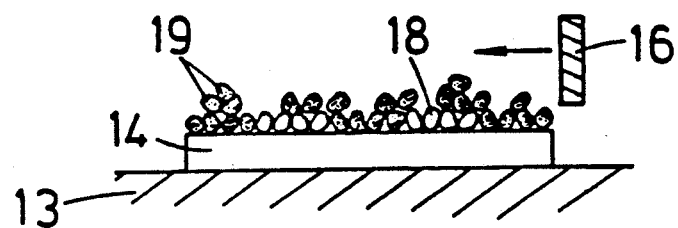
Figure 7G:
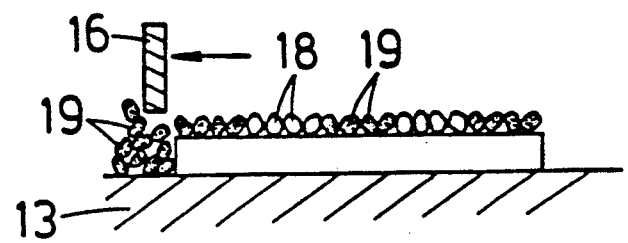
Figure 7H:
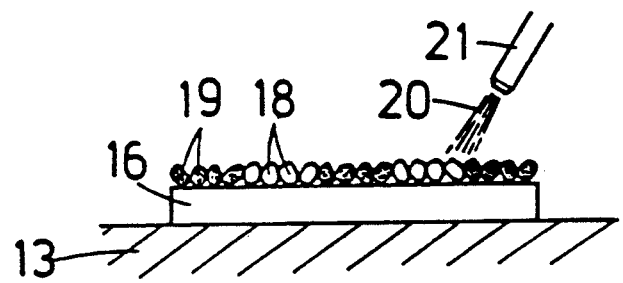

Next, the mold frame 17 is removed (FIG. 7(e)), whereby the (brown) stones 18 are adhered only to the areas which the mold frames did not cover, and the adhesive layer 14 is now exposed at the remaining areas. Natural stones 19 of another color (e.g., black) are placed in abundance (FIG. 7(f). Again excessive (black) stones 19 are removed by the remover 16, and then synthetic resin 20 is spread by a spraying means 20 (FIGS. 7(g), (h)). When spreading of the whole surface is finished, the treatment is finished.

Figure 7I:
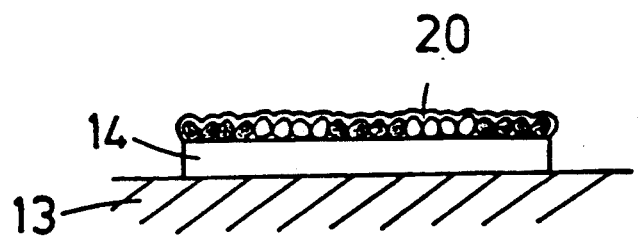
Figure 8:
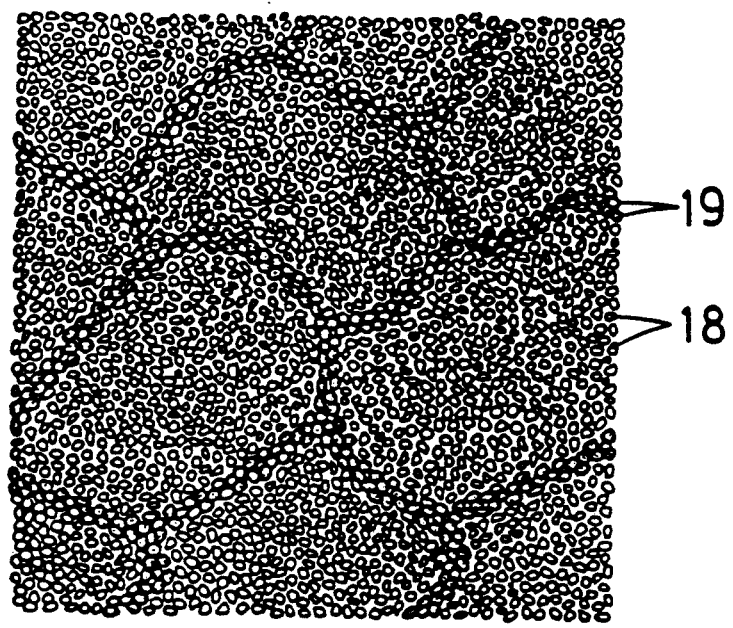
FIG. 8 is a plan view of FIG. 7(*i*).

FIG. 8 is a plan view of a pavement and the like in the state shown in FIG. 7(i). It can be seen that a pattern of joined portions appears clearly.

There are remarkable advantages as mentioned below in the panel, the method for producing the same, and the method for treating surfaces of a building according to the present invention.

PANEL: A finishing treatment can be done easily by only adhering the panels on a pavement or a building. That is, construction time of the finishing treatment process is reduced remarkably. The external appearance is very beautiful, and almost the same as the appearance produced by a conventional washing-treating process. Waterproof characteristics are ensured. The surface does not crack and peel.

Adhesion and water-tightness of joint portions are easily effected when carrying out synthetic resin coating locally. Also, application can be done in a long length.

Panels are manufactured quite easily. This method requires a simple apparatus and no special one is required. When a mold frame is used, patterns can be made easily to provide a fine appearance.

Finishing the surface of a pavement and the like can be done with a simple operation to provide a fine appearance. In a method using mold frames, various patterns such as a joint portion pattern, mosaic patterns and the like are made easily at the site. Since small textured granular articles are spread all over the surface, small textured patterns and various colors can be expressed. Since natural stones, ceramics, and the like are used and synthetic resin is coated thereon, weatherability and wear resistance are excellent.

I claim:

1. A method for treating a structural surface including at least one of a wall and pavement, comprising the steps of:

spreading an adhesive on said structural surface;

applying a mold frame to said adhesive surface;

closely adhering first granular stones of a first appearance on the portions of said adhesive not covered by said mold frame;

removing said mold frame to expose portions of said adhesive surface on said structural surface;

closely adhering second granular stones of a second appearance to said portions of said adhesive surface previously covered by said mold frame to form a substantially planar patterned surface;

covering said first and second granular stones with a coating of synthetic resin;

drying said synthetic resin.

2. A method as in claim 1, wherein said first and second granular stones are placed on said adhesive in excess amounts, and further comprising the step of removing excess stones by scraping with a scraper.

3. A method as in claim 1, wherein said granular stones are placed on said adhesive in excess amounts, and further comprising the step of removing excess stones by a vacuum apparatus that draws away said excess stones.

* * * * *